H. Staub,
Grain Cleaner.
No. 460.  Patented Nov. 4, 1837.
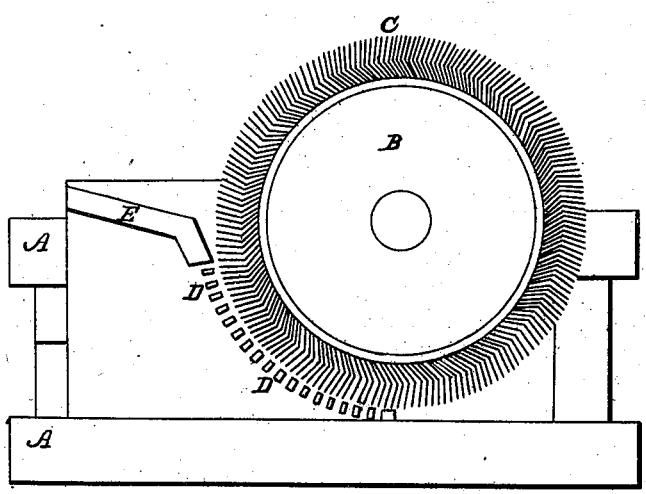

UNITED STATES PATENT OFFICE.

HENRY STAUB, OF SHEPHERDSTOWN, VIRGINIA.

MACHINE FOR SEPARATING GARLIC FROM GRAIN.

Specification of Letters Patent No. 460, dated November 11, 1837.

*To all whom it may concern:*

Be it known I, HENRY STAUB, of Shepherdstown, in the county of Jefferson and State of Virginia, have invented an improved machine for separating of garlic from wheat or other small grain, and which will be found applicable to other purposes; and I do hereby declare that the following is a full and exact description thereof.

The accompanying drawing represents a vertical section of my machine, lengthwise.

A, A, is the frame, within which a cylinder B, is made to revolve by any suitable means. This cylinder I cover, over its whole periphery, with elastic teeth of wire, or narrow elastic strips of metal, secured upon it by nailing, in the manner of cord, by insertion in the wood, or by other suitable means. These wires, or these metallic strips, must be of such strength as to enable them to cut the heads of garlic, and reduce them into small fragments. The size of such wire, or strip, must be regulated by the material of which they are made, iron teeth, for example, will require to be stouter than those made of steel. I usually make them about an inch long, but it may be found advantageous to vary this according to the size of the machine, and other circumstances. These teeth are shown at *c*, surrounding the cylinder. A concave D, D, extends about one fourth of the way around the cylinder; this is formed of rods, or strips of iron, of such thickness as shall be sufficient to preserve them from bending; the strips extend from side to side of the machine, and are placed so near to each other as not to allow a sound grain of wheat to pass between them; they are to have stays between them at suitable distances, to prevent their springing.

E, is a feed board down which the grain is allowed to run, and by which it is fed in between the revolving cylinder and the concave.

The edges of the strips should be square and their angles sharp; and the teeth on the cylinder must be very nearly in contact with them.

In operating with this machine the heads of garlic being softer than the grain, will be broken up by the action of the teeth against the concave of iron slots, between which the larger portion of the fragments will pass, and those which may fall down with the grain may be readily separated by screening.

What I claim as my invention, and desire to secure by Letters Patent, is—

The separating of garlic from grain by passing the same between a revolving cylinder, and a concave of iron, the cylinder being covered with teeth, and the concave formed of strips in the manner herein set forth.

HENRY STAUB.

Witnesses:
W. THOMPSON,
LINTON THORN.